United States Patent
Zhang et al.

(10) Patent No.: US 9,615,194 B2
(45) Date of Patent: *Apr. 4, 2017

(54) SERVICE CONTROL METHOD FOR MACHINE TYPE COMMUNICATIONS DEVICE AND RELATED APPARATUS AND SYSTEM

(71) Applicant: Huawei Technologies Co., Ltd., Shenzhen (CN)

(72) Inventors: Wanqiang Zhang, Beijing (CN); Xiaolong Guo, Beijing (CN); Qi Yu, Beijing (CN); Huadong Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 19 days.

This patent is subject to a terminal disclaimer.

(21) Appl. No.: 14/540,210

(22) Filed: Nov. 13, 2014

(65) Prior Publication Data

US 2016/0142861 A1    May 19, 2016
US 2016/0381489 A9    Dec. 29, 2016

Related U.S. Application Data

(63) Continuation of application No. 13/777,473, filed on Feb. 26, 2013, now Pat. No. 8,913,589, which is a (Continued)

(30) Foreign Application Priority Data

Aug. 26, 2010  (CN) .......................... 2010 1 0268618

(51) Int. Cl.
*H04W 4/00*   (2009.01)
*H04L 12/927*   (2013.01)
(Continued)

(52) U.S. Cl.
CPC ........... *H04W 4/005* (2013.01); *H04L 47/808* (2013.01); *H04W 28/0289* (2013.01);
(Continued)

(58) Field of Classification Search
CPC ..... H04L 47/808; H04L 47/824; G06F 3/067; G06F 9/5016
See application file for complete search history.

(56) References Cited

U.S. PATENT DOCUMENTS

2003/0114158 A1   6/2003  Soderbacka et al.
2005/0096051 A1   5/2005  Lee et al.
(Continued)

FOREIGN PATENT DOCUMENTS

CN        1882173 A        12/2006
CN       101047506 A        10/2007
(Continued)

OTHER PUBLICATIONS

Partial English Translation and Abstract of Chinese Patent Application No. CN101047506A, Aug. 9, 2013, 2 pages.
(Continued)

*Primary Examiner* — Charles Appiah
*Assistant Examiner* — Randy Peaches
(74) *Attorney, Agent, or Firm* — Conley Rose, P.C.

(57) ABSTRACT

A service control method for a machine type communications (MTC) device and a related apparatus are provided. The method includes receiving, by an access-network network element, a paging request message from a core-network network element, wherein the paging request message carries device type indication information of a paged user equipment (UE); determining a device type of the UE according to the device type indication information of the UE; and if the UE is an MTC device, performing the following service operations: paging the UE by using a
(Continued)

dedicated paging resource allocated to an MTC device, or determining whether the UE is an MTC device allowed to be accessed in a service control policy, and paging the UE if the UE is an MTC device allowed to be accessed in a service control policy, or determining not to page the UE, and sending a paging reject message to the core-network network element.

14 Claims, 10 Drawing Sheets

Related U.S. Application Data continuation of application No. PCT/CN2011/075324, filed on Jun. 3, 2011.

(51) Int. Cl.
*H04W 28/02* (2009.01)
*H04W 76/02* (2009.01)
*H04W 36/24* (2009.01)
*H04W 36/00* (2009.01)
*H04L 12/911* (2013.01)
*H04W 36/08* (2009.01)
*H04W 68/00* (2009.01)

(52) U.S. Cl.
CPC ....... *H04W 36/0072* (2013.01); *H04W 36/24* (2013.01); *H04W 76/027* (2013.01); *H04L 47/824* (2013.01); *H04W 36/08* (2013.01); *H04W 68/005* (2013.01)

(56) References Cited

U.S. PATENT DOCUMENTS

| | | | |
|---|---|---|---|
| 2007/0249347 A1 | 10/2007 | Saifullah et al. | |
| 2008/0032715 A1 | 2/2008 | Jia et al. | |
| 2008/0291872 A1 | 11/2008 | Henriksson | |
| 2010/0146117 A1 | 6/2010 | Hoeksel | |
| 2011/0275382 A1 | 11/2011 | Hakola et al. | |
| 2012/0269174 A1 | 10/2012 | Yang et al. | |
| 2013/0170347 A1* | 7/2013 | Zhang | H04L 47/808 370/230 |
| 2013/0286841 A1 | 10/2013 | Gao et al. | |

FOREIGN PATENT DOCUMENTS

| | | |
|---|---|---|
| CN | 101541041 A | 9/2009 |
| CN | 101651975 A | 2/2010 |
| CN | 101808363 A | 8/2010 |

OTHER PUBLICATIONS

Foreign Communication From a Counterpart Application, Chinese Application No. 201010268618.8, Chinese Office Action dated Jul. 3, 2013, 6 pages.
Foreign Communication From a Counterpart Application, PCT Application No. PCT/CN2011/075324, International Search Report dated Sep. 22, 2011, 4 pages.
Foreign Communication From a Counterpart Application, PCT Application No. PCT/CN2011/075324, Written Opinion dated Sep. 22, 2011, 4 pages.
"3rd Generation Partnership Project; Technical Specification Group Services and System Aspects; System Improvements for Machine-Type Communications; (Release 10)," 3GPP TR 23.888, V0.5.1, Technical Report, Jul. 2010, 75 pages.
"3rd Generation Partnership Project; Technical Specification Group Radio Access Network; Evolved Universal Terrestrial Radio Access Network (E-UTRAN); S1 Application Protocol (S1AP) (Release 9)," 3GPP TS 36.413, V9.3.0, Technical Specification, Jun. 2010, 241 pages.
Notice of Allowance dated Oct. 15, 2014, 18 pages, U.S. Appl. No. 13/777,473, filed on Feb. 26, 2013.

* cited by examiner

SERVICE CONTROL METHOD FOR MACHINE TYPE COMMUNICATIONS DEVICE AND RELATED APPARATUS AND SYSTEM

CROSS-REFERENCE TO RELATED APPLICATIONS

This application is a continuation of U.S. application Ser. No. 13/777,473, filed on Feb. 26, 2013, which is a continuation of International Application No. PCT/CN2011/075324, filed on Jun. 3, 2011, which claims priority to Chinese Patent Application No. 201010268618.8, filed on Aug. 26, 2010, all of which are hereby incorporated by reference in their entireties.

TECHNICAL FIELD

The present invention relates to the communications field, and in particular, to a service control method for a machine type communications (MTC) device and a related apparatus and system.

BACKGROUND

An MTC application refers to network communications performed by one network element or between multiple network elements without human involvement, such as applications for traffic control and management, remote meter reading, remote monitoring, mobile payment, location tracking, and medical monitoring. A typical scenario of a service like remote monitoring is that a sensor node obtains environment information and sends environment data to a corresponding control node through wireless communications, and the control node performs different processing according to the environment data.

In actual applications, a user equipment (UE) is normally classified into two main types, namely, an MTC device and a human-to-human (H2H) communications device.

In a system architecture evolution (SAE) communications system, an H2H communications device or an MTC device accesses a mobility management entity (MME) and a serving gateway (S-GW) of a core network through an evolved universal mobile telecommunications system terrestrial radio access network NodeB (E-UTRAN NodeB, eNodeB, or eNB) of an access network, and is connected to a packet data network gateway (P-GW) through the S-GW.

In downlink service control, when an existing wireless network serves a UE (for example, an MTC device or an H2H communications device), a network side normally serves the MTC device and the H2H communications device according to same service processing logic. Due to a limit of wireless resources, deployment of a large quantity of MTC devices significantly affects an H2H service, for example, it may limit accessing or service implementation of an H2H device.

SUMMARY

Embodiments of the present invention provide a service control method for an MTC device and a related apparatus and system, which are used for limiting service implementation of an MTC device, thereby reducing an impact on an H2H service.

In order to solve the foregoing technical problems, the embodiments of the present invention provide the following technical solutions.

A service control method for an MTC device includes receiving, by an access-network network element, a service request message from a core-network network element, where the service request message carries device type indication information of a UE, and the device type indication information of the UE is used to indicate whether the UE is an MTC device; determining a device type of the UE according to the device type indication information of the UE; and if a current load of the access-network network element exceeds a set threshold, determining, according to the device type of the UE, whether to execute a service operation corresponding to the service request message.

A service control method for an MTC device includes receiving, by a target-access-network network element, a handover request message from a source-access-network network element, where the handover request message carries device type indication information of a UE, and the device type indication information of the UE is used to indicate whether the UE is an MTC device; determining a device type of the UE according to the device type indication information of the UE; and if a current load of the target-access-network network element exceeds a set threshold, determining, according to the device type of the UE, whether to execute a handover operation corresponding to the handover request message.

An access-network network element includes a first receiving unit configured to receive a service request message from a core-network network element, where the service request message carries device type indication information of a UE, and the device type indication information of the UE is used to indicate whether the UE is an MTC device; a first determining unit configured to determine a device type of the UE according to the device type indication information of the UE; and a first service controlling unit configured to, when a current load of the access-network network element exceeds a set threshold, determine, according to the device type of the UE, whether to execute a service operation corresponding to the service request message.

An access-network network element includes a second receiving unit configured to receive a handover request message from a source-access-network network element, where the handover request message carries device type indication information of a UE, and the device type indication information of the UE is used to indicate whether the UE is an MTC device; a second determining module configured to determine a device type of the UE according to the device type indication information of the UE; and a second service controlling unit configured to, when a current load of the access-network network element exceeds a set threshold, determine, according to the device type of the UE, whether to execute a handover operation corresponding to the handover request message.

A service control system includes a core-network network element and an access-network network element, where the access-network network element is configured to receive a service request message from the core-network network element, where the service request message carries device type indication information of a UE, and the device type indication information of the UE is used to indicate whether the UE is an MTC device; determine a device type of the UE according to the device type indication information of the UE; and if a current load of the access-network network element exceeds a set threshold, determine, according to the device type of the UE, whether to execute a service operation corresponding to the service request message.

A service control system includes a target-access-network network element and a source-access-network network element, where the target-access-network network element is configured to receive a handover request message from the source-access-network network element, where the handover request message carries device type indication information of a UE, and the device type indication information of the UE is used to indicate whether the UE is an MTC device; and if a current load of the target-access-network network element exceeds a set threshold, determine, according to the device type of the UE, whether to execute a handover operation corresponding to the handover request message.

It may be seen from the foregoing that, in embodiments of the present invention, a core-network network element or another access-network network element carries device type indication information of a UE in a service request message delivered to an access-network network element, where the device type indication information of the UE is used to indicate whether the UE is an MTC device, so that after receiving the service request message, the access-network network element may determine, according to a type indication of the UE, whether the UE is an MTC device, and if a current load of the access-network network element exceeds a set threshold, determine, according to the device type of the UE, whether to execute a service operation corresponding to the service request message. With this mechanism, an MTC device may be controlled, which helps to limit implementation of an MTC service triggered by the core-network network element or the another access-network network element, thereby reducing an impact of the MTC service on an H2H service.

DETAILED DESCRIPTION

Figure 1:
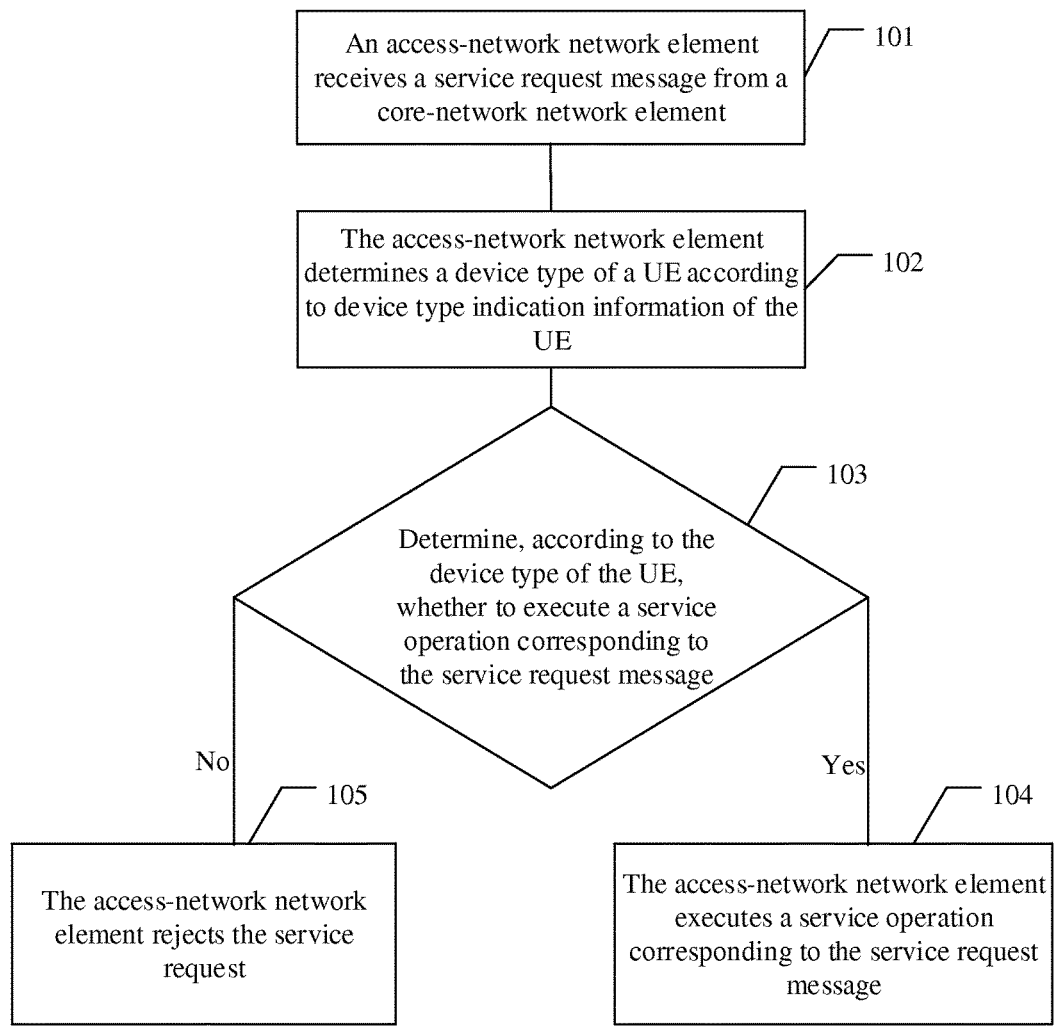
FIG. 1 is a schematic flowchart of a service control method for an MTC device according to an embodiment of the present invention.

Embodiments of the present invention provide a service control method for an MTC device, which is used for limiting service implementation of an MTC device, thereby reducing an impact on an H2H service.

It should be noted first that, an access-network network element referred to in the embodiments of the present invention is an entity capable of implementing terminal wireless access management, and may have different names, locations, and product forms in different networks. The access-network network element in the embodiments of the present invention may refer to, for example: an eNodeB, a home eNodeB (HeNB), or a base station of another type in an evolved universal mobile telecommunications system (UMTS) terrestrial radio access network (E-UTRAN); or a base station controller or a radio network controller (RNC) in a UMTS terrestrial radio access network (UTRAN)/global system for mobile communications (GSM) enhanced data rates for GSM evolution (GSM EDGE) radio access network (GERAN). An access-network network element in a non-3rd Generation Partnership Project (3GPP) network may refer to an entity having an access network logic function of an evolved packet data gateway (ePDG) in a wireless local area network (WLAN), an access service network base station (ASN BS) in a worldwide interoperability for microwave access (WiMAX) network, or an entity having an access network logic function of a high rate packet data access network (HRPD AN) in a code division multiple access (CDMA) network, or an entity implementing terminal wireless access management in another network.

A mobility management network element referred to in the embodiments of the present invention is an entity capable of implementing a terminal mobility management logic function, and may have different names, locations, and product forms in different networks. The mobility management network element in the embodiments of the present invention may refer to an MME connected to an E-UTRAN, or a serving general packet radio service support node (SGSN) connected to a UTRAN/GERAN. An access gateway (AGW) in a non-3GPP network may be an entity having a mobility management logic function of an ePDG in a WLAN, an access service network gateway (ASN GW) in a WiMAX network, an entity having a mobility management logic function of an HRPD AN in a CDMA network, or an entity implementing a mobility management logic function in another network.

The following describes the service control method for an MTC device in the embodiments of the present invention.

An embodiment of a service control method for an MTC device in the embodiments of the present invention may include: receiving, by an access-network network element, a service request message from a core-network network element, where the service request message carries device type indication information of a UE, and the device type indication information of the UE is used to indicate whether the UE is an MTC device; determining a device type of the UE according to the device type indication information of the UE; and if a current load of the access-network network element exceeds a set threshold, determining, according to the device type of the UE, whether to execute a service operation corresponding to the service request message.

As shown in FIG. 1, the method may include:

101: An access-network network element receives a service request message from a core-network network element.

In actual applications, for example, in an application scenario where a UE (such as an MTC device or an H2H communications device) needs to be paged, an initial context corresponding to a UE needs to be set up, or a UE needs to be handed over between access-network network elements, or in another application scenario, a core-network network element (such as a mobility management network element) may send a service request message to an access-network network element to trigger executing of a service operation corresponding to the service request message by the access-network network element.

For example, the mobility management network element may send a paging request message for triggering paging of the UE to the access-network network element to trigger paging of the UE by the access-network network element; or the mobility management network element may send an initial context setup request message to the access-network network element to trigger setup of an initial context corresponding to the UE by the access-network network element; or the mobility management network element may send a handover request message to the access-network network element to trigger executing of an operation of handing over the corresponding UE between access-network network elements by the access-network network element.

The core-network network element may carry device type indication information of the UE in the service request message, where the device type indication information of the UE is used to indicate whether the UE is an MTC device. When receiving the service request message, the access-network network element may acquire whether a device type of the UE corresponding to the service request message is an MTC device, where the device type of the UE may be an MTC device or an H2H device.

It is understandable that the core-network network element may carry the device type indication information of the UE in the service request message in multiple manners. For example, the core-network network element may add a new parameter to an existing standard service request message to indicate the device type of the UE; and may extend a meaning of an existing parameter in a request message to indicate the device type of the UE, for example, add some bits to the existing parameter to indicate the device type of the UE; and similarly, may use some bits in the existing parameter for indicating instead of adding an indicator bit to the existing parameter, which is not limited here.

Further, the core-network network element may also carry service indication information for indicating a priority of the service in the service request message. The service indication information for indicating the priority of the service may, for example, indicate a priority number of the service, and may also indicate a service attribute such as time tolerance (for example, whether a delay is allowed or not, or an allowed delay duration) information (in actual applications, it may be deemed that lower time tolerance, that is, shorter allowed delay duration, corresponds to a higher priority), or may be other information which may directly or indirectly indicate the priority of the service, which is not limited here. Similarly, the core-network network element may also carry the service indication information in the service request message in multiple manners. For example, the priority of the service may be indicated by adding a parameter priority indicator (which may be a high priority, a low priority, or a group of numbers ranging from 0 to 13) to the service request message, and may also be represented by using an existing parameter, which is not limited here.

It is understandable that the core-network network element may also carry other information, as such a UE identifier or a bearer identifier, in the service request message, which is not limited here.

102: The access-network network element determines a device type of the UE according to the device type indication information of the UE.

103: The access-network network element determines, according to the device type of the UE, whether to execute a service operation corresponding to the service request message.

If a current load of the access-network network element exceeds a set threshold, the access-network network element may determine, according to the device type of the UE, whether to execute the service operation corresponding to the service request message. If yes, step 104 is executed; if no, step 105 is executed.

In an application scenario, if the current load of the access-network network element exceeds the set threshold, the access-network network element may determine, according to the device type of the UE, whether to execute the service operation corresponding to the service request message, which may include, if the device type of the UE is an MTC device, refusing to execute the service operation corresponding to the service request message, and sending a message for refusing to execute the service operation corresponding to the service request message; certainly, if a preset condition is met, the access-network network element may execute the service operation corresponding to the service request message; if the device type of the UE is an H2H device, the access-network network element may execute the service operation corresponding to the service request message.

In another embodiment, when the current load of the access-network network element exceeds the set threshold, if the service request message further carries the service indication information for indicating the priority of the service, the access-network network element may determine, according to the device type of the UE and the service priority, whether to execute the service operation corresponding to the service request message, which may include, if the device type of the UE is an MTC device and the service priority is lower than a preset value, refusing to execute the service operation corresponding to the service request message, and sending a message for refusing to execute the service operation corresponding to the service request message; if the device type of the UE is an MTC device and the service priority is higher than a preset value, executing the service operation corresponding to the service request message; and if the device type of the UE is an H2H device, executing the service operation corresponding to the service request message.

In actual applications, the access-network network element may reject all service requests corresponding to the MTC device, or under a precondition that the priority of the service is acquired, according to a current load status of the access-network network element, accept only a request of a service which has a specific priority and corresponds to the MTC device, or according to a current load status of the access-network network element and the priority of the service, accept a certain proportion of service requests corresponding to the MTC device.

104: The access-network network element executes the service operation corresponding to the service request message.

In an application scenario, if the access-network network element determines that the service operation corresponding to the service request message may be executed, it executes the service operation corresponding to the service request message.

For example, if the service request message is a paging request message, the access-network network element may initiate paging to an MTC device to be paged by the core-network network element, or if the service request message is an initial context setup request message, the access-network network element may set up an initial context corresponding to the MTC device and a corresponding air interface bearer, and may send an INITIAL CONTEXT SETUP RESPONSE message to the corresponding core-network network element; if the service request message is a handover request message, the access-network network element executes an operation of handing over the corresponding MTC device between access-network network elements, and may send a handover request response message to the core-network network element.

Further, after receiving the initial context setup request message and setting up an initial context corresponding to the MTC device and a corresponding air interface bearer, the access-network network element may also receive a bearer setup request message or a bearer modify request message from the core-network network element. In this case, if the access-network network element determines to execute a bearer processing operation corresponding to the bearer setup request message or the bearer modify request message, the access-network network element may set up or modify a corresponding air interface bearer, and may send a bearer setup or modify accept message to the corresponding core-network network element.

105: Reject the service request.

In an application scenario, when the access-network network element rejects the service request, the access-network network element may send a service reject message to the core-network network element, and may carry a reason for rejecting the request in the service reject message, where the reason for rejecting the request may be, for example, the access-network network element is overloaded currently, or the access network is busy, and may also carry a time parameter in the service reject message, so that the core-network network element may re-initiate the service request after a corresponding delay period according to the time parameter. Certainly, the access-network network element may also not carry the reason for rejecting the request and the time parameter in the service reject message, or not send the service reject message to the core-network network element, which is not limited here.

The service control method for the MTC device according to the embodiment of the present invention may be applicable to scenarios such as a wideband code division multiple access (WCDMA), WiMAX, GSM, SAE communications systems, and long term evolution (LTE) communications system.

It may be seen from the foregoing that, a core-network network element (such as the mobility management network element) in the embodiment carries device type indication information of a UE in a service request message delivered to an access-network network element, so that after receiving the service request message, the access-network network element may determine a device type of the UE according to a type indication of the UE, and if it is determined that the UE is an MTC device and a current load of the access-network network element exceeds a set threshold, determine, according to a preset service control policy concerning the MTC device, whether to execute a service operation corresponding to the service request message. With this mechanism, an MTC device may be controlled, which helps to limit implementation of an MTC service triggered by the core-network network element, thereby reducing an impact of the MTC service on an H2H service.

Figure 2:
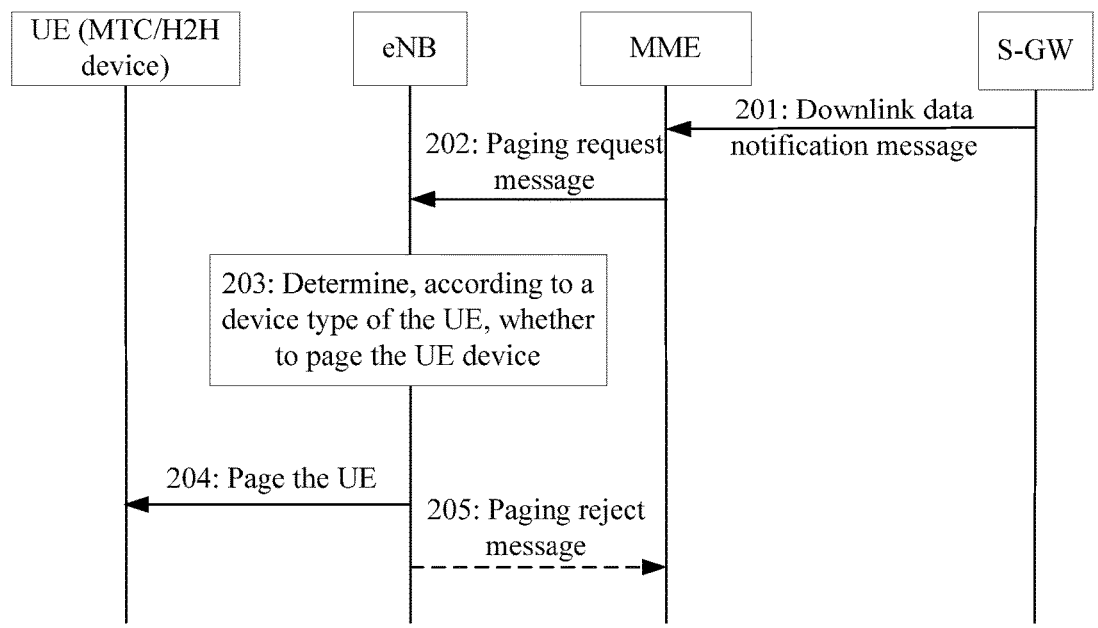
FIG. 2 is a schematic flowchart of another service control method for an MTC device according to an embodiment of the present invention.

In order to facilitate a better understanding of the technical solutions of the present invention, the following takes a process of initiating, by an MME, paging to an eNB in an LTE communications system as an example, and uses a specific application scenario to describe in detail a service control method for an MTC device described in an embodiment of the present invention. Referring to FIG. 2, the method includes:

201: An S-GW sends a downlink data notification message to an MME to indicate that there is downlink data that needs to be delivered to a UE, thereby triggering paging of the UE by the MME.

In an application scenario, the S-GW may send the downlink data notification message to the MME through a bearer channel corresponding to a certain UE (such as an MTC device or an H2H communications device). The MME may acquire, according to locally stored context information of the UE and the bearer channel for receiving the downlink data notification message, whether a device type of the UE to which the downlink data is to be delivered is an MTC device or an H2H communications device. In this embodiment, a case in which the S-GW has downlink data that needs to be delivered to the MTC device is taken as an example.

The S-GW may carry a bearer identifier in the downlink data notification message sent to the MME. If different bearers correspond to different service priorities, the MME may acquire, according to the bearer identifier, a service to be initiated and a priority of the service. Certainly, the S-GW may also not carry the bearer identifier, but indicates the service to be initiated and the service priority of the service through a default bearer identifier such as an access point name (APN) or a linked bearer identifier (Linked Bearer ID). The S-GW may also carry other service indication information for indicating the priority of the service in the downlink data notification message, where the service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here. The service indication information may be carried in the downlink data notification message in multiple manners. For example, the priority of the service may be indicated by adding a parameter priority indicator (which may be a high priority, a low priority, or a group of numbers ranging from 0 to 13) to the service request message, and the priority of the service may also be indicated by using an existing parameter such as Quality of Service Class Identifier (QCI) in Quality of Service (QoS) or Priority level in allocation retention priority (ARP), which is not limited here.

It is understandable that if the priority of the service is indicated to the MME when the service is set up or the priority of the service is indicated by using an existing parameter in QoS, the S-GW does not need to carry the service indication information, and the MME may obtain priority information of the service from stored context information.

202: The MME sends a paging request message to an eNB.

In an application scenario, when receiving the downlink data notification message, the MME may acquire, through the downlink data notification message, the UE to which the downlink data notification message is directed, and may acquire a type of the UE, such as an MTC device or an H2H communications device, according to locally stored context information.

If the MME finds that the UE is in an idle state, the MME sends a paging request message to the eNB of an access network to page the UE, and carries a UE identifier and device type indication information of the UE in the paging request message to indicate the device type of the UE to be paged, where the device type indication information of the UE may be used to indicate whether the UE is an MTC device.

It is understandable that the MME may carry the device type indication information of the UE in the paging request message in multiple manners. For example, the MME may add a new parameter such as an MTC device or H2H communications device indicator to an existing standard paging request message, or use some bits in an existing parameter to indicate the device type of the UE to be paged, or extend an existing parameter, for example, extend a core network domain or a paging reason to indicate the device type of the UE to be paged, which is not limited here.

Further, the MME may also carry service indication information for indicating a priority of the service in the paging request message, so that the eNB acquires the priority of the service. The service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

Similarly, the MME may carry the service indication information in the paging request message in multiple manners. For example, the priority of the service may be indicated by adding a parameter priority indicator (which may be a high priority, a low priority, or a group of numbers ranging from 0 to 13) to the paging request message, and may also be indicated by using an existing parameter such as QCI in QoS or Priority level in ARP, which is not limited here.

Certainly, the MME may also carry other information in the paging request message, which is not limited here.

It should be noted that before the MME pages the UE via the eNB, if the device type of the UE paged by the MME is an MTC device, the MME may determine whether to send the paging request message to the eNB according to information such as a current load status and the priority which is of the service and indicated by the service indication information, or when acquiring that the eNB to be paged is in an overload status, the MME may not send the paging request message to the eNB.

203: The eNB determines, according to the device type of the UE, whether to page the UE.

In an application scenario, when receiving the paging request message sent by the MME, if the eNB acquires that the device type of the UE is an MTC device according to the device type indication information which is of the UE and carried in the paging request message, and when a current load of the eNB exceeds a set threshold, the eNB may determine, according to the device type of the UE, whether to page the MTC device; for example, if the paging request message also carries the service indication information for indicating the priority of the service, the eNB may determine, according to the priority which is of the service and indicated by the service indication information and the device type of the UE, whether to page the UE.

If the eNB determines to page the UE, step 204 is executed.

If the eNB determines not to page the UE, step 205 is executed.

In an actual application, depending on various application scenarios, the eNB determines, according to the device type of the UE, whether to execute a service operation corresponding to the service request message, which may be, for example, paging no MTC device, or only paging an MTC device allowed to be accessed in a service control policy, or under a precondition that the priority of the service is acquired, according to a current load status of the eNB, only paging an MTC device corresponding to a service having a certain priority. Certainly, other solutions may also be used and may be set according to actual network conditions, which is not limited here.

204: The eNB pages the UE.

For example, if the UE is an MTC device, the eNB may page the MTC device in the following manners.

If a dedicated paging resource or specific processing is available for the MTC device, the eNB may use a dedicated paging resource which is allocated to the MTC device and may be a dedicated paging channel (PCH), or use a dedicated manner to compute paging parameters of the MTC device, where the paging parameters include a paging frame number and a paging occasion, which is not limited here.

If no dedicated resource is allocated to or no specific processing is performed on the MTC device, the eNB pages the MTC device through an air interface.

205: The eNB sends a paging reject message to the MME.

If the eNB determines not to page the UE, the eNB may send the paging reject message to the MME.

Further, the eNB may carry a reject reason in the paging reject message. If the UE is an MTC device, the reject reason may be that the eNB is overloaded, the MTC service is overloaded, and so on. The eNB may also add a time parameter to the paging reject message. When receiving the time parameter, the MME may re-initiate a paging request after a corresponding delay period. Further, during the delay period, the MME may not initiate paging to the UE, where the UE includes an MTC device and a non-MTC device (for example, an H2H communications device), or initiate paging to only the non-MTC device and no longer page the MTC device, which is not limited here.

A specific application scenario of the foregoing embodiment is described by taking a process as an example, where in an LTE communications system, when an MME receives a downlink data notification message and finds that a UE corresponding to the downlink data notification message is in an idle mode, the MME delivers a paging request message carrying device type indication information of the UE to an eNB in an access network to trigger paging of the UE by the eNB. It should be noted that the service control method for an MTC device according to the embodiment of the present invention may also be applicable to other communications systems. Similar network elements may be replaced with reference to the foregoing embodiment of the present invention for applying the method to other communications systems, which is not repeatedly described here.

It may be seen from the foregoing that, in the embodiment, an MME carries device type indication information of a UE in a paging request message, where the device type indication information of the UE is used to indicate whether the UE is an MTC device, so that after receiving the paging request message, the eNB may determine whether the UE is an MTC device according to a type indication of the UE, and if a current load of the eNB exceeds a set threshold, the eNB may determine, according to the device type of the UE, whether to page the UE. With this mechanism, an MTC device may be controlled, which helps to limit implementation of an MTC services triggered by the core-network network element, thereby reducing an impact of the MTC service on an H2H service.

Further, in the foregoing embodiment, the MME may also carry service indication information in the paging request message, so that the eNB acquires the priority of the service. When the current load of the eNB exceeds the set threshold, the eNB may determine, according to the priority which is of the service and indicated by the service indication information, whether to page the MTC device. This manner helps to limit implementation of a non-emergency MTC service and is capable of relatively reducing a network load.

Meanwhile, when the eNB rejects the paging request of the MME, the eNB sends a paging reject message to the MME, and carries a reject reason and a time parameter in the paging reject message, so that the MME acquires the reject reason and re-initiates, according to the time parameter, a paging request after a corresponding delay period.

Figure 3:
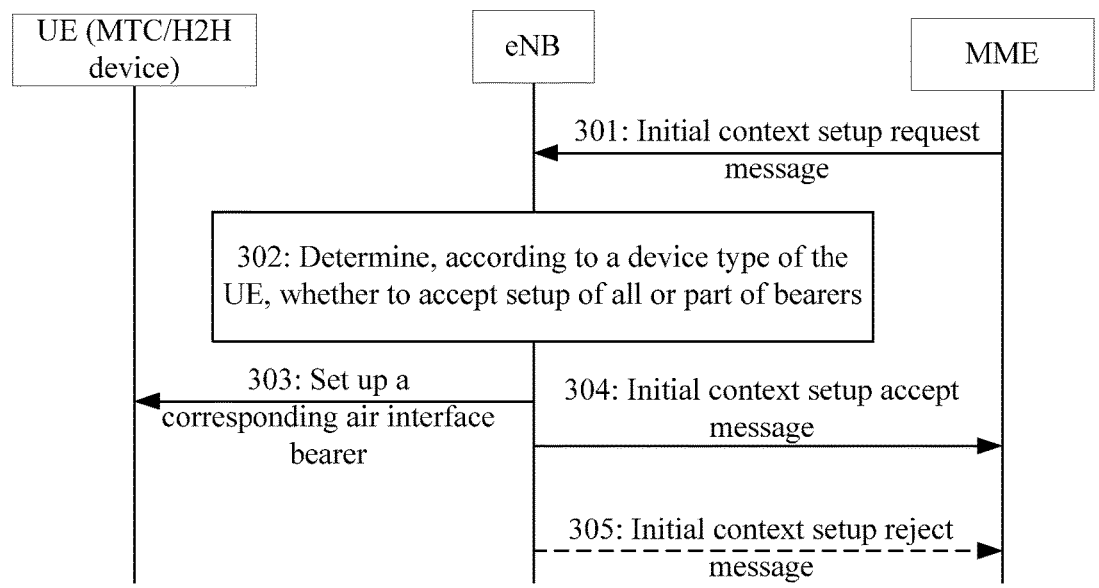
FIG. 3 is a schematic flowchart of another service control method for an MTC device according to an embodiment of the present invention.

In order to facilitate a better understanding of the technical solutions of the present invention, the following takes a process of requesting, by an MME, an eNB to set up an initial context in an LTE communications system as an example, and uses a specific application scenario to describe in detail a service control method for an MTC device described in an embodiment of the present invention. Referring to FIG. 3, the method may include:

301: An MME sends an initial context setup request message.

In an application scenario, when the MME, for example, receives an attach request message, a service request, or a location update request message sent by a UE, the MME may send an initial context setup request message to an eNB to trigger setup of an initial context corresponding to the UE by the eNB and allocate a bearer resource.

The MME sends the initial context setup request message to the eNB of an access network, and carries device type indication information of the UE in the initial context setup request message to indicate a device type of the UE corresponding to the initial context setup request message, where the device type indication information of the UE is used to indicate whether the UE is an MTC device.

It is understandable that the MME may carry the device type indication information of the UE in the initial context setup request message in multiple manners. For example, the MME may add a new parameter such as an MTC device or H2H communications device type indication parameter to an existing initial context setup request message, or use some bits of an existing parameter to indicate the device type of the UE, or extend an existing parameter to indicate the device type of the UE, which is not limited here.

Further, the MME may also carry service indication information for indicating a priority of the service in the initial context setup request message, so that the eNB acquires the priority of the service. The service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

Similarly, the MME may carry the service indication information in the initial context setup request message in multiple manners. For example, the priority of the service may be indicated by adding a parameter priority indicator (which may be a high priority, a low priority, or a group of numbers ranging from 0 to 13) to the request message, for example, a service indicator based on bearer granularity may be added to E-UTRAN radio access bearer (E-RAB) to Be Setup List; and may also be indicated by using an existing parameter such as QCI in E-RAB Level QoS Parameters under E-RAB to Be Setup List or Priority level in ARP, which is not limited here.

It is understandable that the MME may also carry other information, such as a UE identifier or a bearer identifier, in the initial context setup request message, which is not limited here.

302: The eNB determines, according to the device type of the UE, whether to accept setup of all or part of bearers.

When receiving the initial context setup request message sent by the MME, if the eNB acquires that the device type of the UE is an MTC device according to the device type indication information which is of the UE and carried in the initial context setup request message, and when a current load of the eNB exceeds a set threshold, the eNB may determine, according to the device type of the UE, whether to accept setup of all or part of bearers. For example, if the initial context setup request message also carries the service indication information for indicating the priority of the service, the eNB may determine, according to the priority which is of the service and indicated by the service indication information and the device type of the UE, whether to accept setup of all or part of bearers.

If yes, steps 303 and 304 are executed.

If no, step 305 is executed.

In an actual application, depending on various application scenarios, the determining, by the eNB and according to the device type of the UE, whether to execute a service operation corresponding to the service request message may be, for example, rejecting all initial context setup requests corresponding to the MTC device; or only accepting an initial context setup request corresponding to an MTC device allowed to be accepted in a service control policy; or according to a current load status of the eNB, only accepting part of initial context setup requests corresponding to the MTC device; or under a precondition that the priority of the service is acquired, according to a current load status of the eNB, only accepting an initial context setup request of a service which has a specific priority and corresponds to the MTC device; or according to a current load status of the eNB and the priority of the service, accepting a specific proportion of initial context setup requests corresponding to the MTC device. Certainly, other solutions may also be used and may be set according to actual network conditions, which is not limited here.

303: The eNB sets up a corresponding air interface bearer with the UE.

When determining to accept setup of all or part of bearers, the eNB sets up the corresponding air interface bearer with the UE.

304: The eNB sends an INITIAL CONTEXT SETUP RESPONSE message to the MME.

When determining to accept setup of all or part of bearers, the eNB may also send the initial context setup response to the MME.

305: The eNB sends an initial context setup reject message to the MME.

When sending the initial context setup reject message to the MME, the eNB may further carry a reject reason in the initial context setup reject message. If the UE is an MTC device, the reject reason may be that the eNB is overloaded, the MTC service is overloaded, and so on. The eNB may also add a time parameter to the initial context setup reject message. When receiving the time parameter, the MME may re-initiate an initial context setup request after a corresponding delay period, which is not limited here.

A specific application scenario of the foregoing embodiment is described by taking a scenario as an example, where in an LTE communications system, when a UE is in a connected state and an MME needs to request a bearer resource, the MME delivers an initial context setup request carrying device type indication information of the UE to an eNB of an access network. It should be noted that the service control method for an MTC device according to the embodiment of the present invention may also be applicable to other communications systems. Similar network elements may be replaced with reference to the foregoing embodiment of the present invention for applying the method to similar scenarios in other communications systems, which is not repeatedly described here.

It may be seen from the foregoing that, in the embodiment, an MME carries device type indication information of a UE in an initial context setup request message, where the device type indication information of the UE is used to indicate whether the UE is an MTC device, so that after receiving the initial context setup request message, the eNB may determine, according to a type indication of the UE, whether the UE is the MTC device, and if a current load of the eNB exceeds a set threshold, the eNB may determine, according to the device type of the UE, whether to accept setup of all or part of bearers. With this mechanism, an MTC device may be controlled, which helps to limit implementation of an MTC service triggered by a core-network network element, thereby reducing an impact of the MTC service on an H2H service.

Further, in the foregoing embodiment, the MME also carries service indication information in the initial context setup request message, so that the eNB acquires a priority of the service. If the UE is an MTC device and when the current load of the eNB exceeds the set threshold, the eNB may determine, according to the priority which is of the service and indicated by the service indication information, whether to accept setup of all or part of bearers, which helps to limit implementation of a non-emergency MTC service, thereby relatively reducing a network load.

Meanwhile, when the eNB rejects the initial context setup request of the MME, the eNB sends an initial context setup reject message to the MME, and carries a reject reason and a time parameter in the initial context setup reject message, so that the MME acquires the reject reason and re-initiates, according to the time parameter, an initial context setup request after a corresponding delay period.

Figure 4:
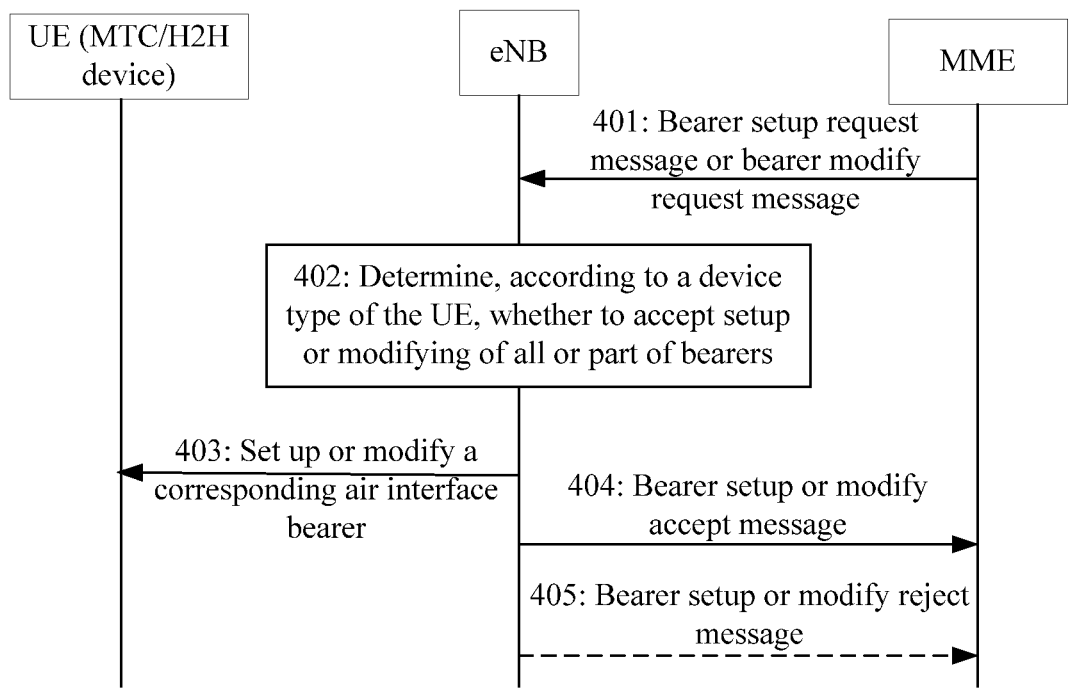
FIG. 4 is a schematic flowchart of another service control method for an MTC device according to an embodiment of the present invention.

In order to facilitate a better understanding of the technical solutions of the present invention, the following takes a process of initiating, by an MME, bearer setup or modification to an eNB in an LTE communications system as an example, and uses a specific application scenario to describe in detail a service control method for an MTC device described in an embodiment of the present invention. Referring to FIG. 4, the method may include:

401: An MME sends a bearer setup request message or a bearer modify request message.

In an application scenario, after an eNB sets up an initial context corresponding to an MTC device and sets up a corresponding air interface bearer with the MTC device, the MME may send the bearer setup request message or the bearer modify request message to an eNB of an access network to request setup or modifying of the air interface bearer between the eNB and the MTC device.

It is understandable that the eNB may, according to the initial context that is set up, acquire that the bearer setup request message or the bearer modify request message is directed to an MTC device.

Further, the MME may also carry service indication information for indicating a service priority in the bearer setup request message or the bearer modify request message, so that the eNB acquires the priority of the service.

In an application scenario, the service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

Similarly, the MME may carry the service indication information for indicating the service priority in the bearer setup request message or the bearer modify request message in multiple manners. For example, the priority of the service may be indicated by adding a parameter priority indicator (which may be a high priority, a low priority, or a group of numbers ranging from 0 to 13) to the request message, for example, a service indicator based on bearer granularity may be added to E-RAB to Be Setup List; and may also be indicated by using an existing parameter such as QCI in E-RAB Level QoS Parameters under E-RAB to Be Setup List or Priority level in ARP, which is not limited here.

It is understandable that the MME may also carry other information, such as a UE identifier or a bearer identifier, in the bearer setup request message or the bearer modify request message, which is not limited here.

402: According to a device type of the UE, the eNB determines whether to accept all or part of bearers requested to be set up or modified.

In an application scenario, when receiving the bearer setup request message or the bearer modify request message sent by the MME, if the eNB acquires that the device type of the UE is an MTC device or an H2H device according to the device type indication information which is of the UE and carried in the request message or according to context information which is of the UE and set up, and when a current load of the eNB exceeds a set threshold, the eNB may determine, according to the device type of the UE, whether to accept setup or modifying of all or part of bearers. If the bearer setup request message or the bearer modify request message also carries service indication information for indicating the priority of the service, the eNB may determine, according to the priority which is of the service and indicated by the service indication information and the device type of the UE, whether to accept setup or modifying of all or part of bearers.

If yes, steps 403 and 404 are executed.

If no, step 405 is executed.

In an actual application, depending on various application scenarios, the determining, by the eNB and according to the device type of the UE, whether to execute a bearer processing operation corresponding to the bearer setup or modify request message may be, for example, rejecting all bearer setup or modify requests corresponding to the MTC device; or only accepting a bearer setup or modify request corresponding to an MTC device allowed to be accepted in a service control policy; or according to a current load status of the eNB, only accepting part of bearer setup or modify requests corresponding to the MTC device; or under a precondition that the priority of the service is acquired, according to a current load status of the eNB, only accepting a bearer setup or modify request of a service which has a specific priority and corresponds to the MTC device; or according to a current load status of the eNB and the priority of the service, accepting a specific proportion of bearer setup or modify requests corresponding to the MTC device. Certainly, other solutions may also be used and may be set according to actual network conditions, which is not limited here.

403: The eNB sets up or modifies a corresponding air interface bearer with the UE.

For example, if the UE is an MTC device, when the eNB determines to accept setup or modifying of all or part of bearers, the eNB sets up or modifies the corresponding air interface bearer with the MTC device.

404: The eNB sends a bearer setup or modify accept message to the MME.

When the eNB determines to accept setup or modifying of all or part of bearers, the eNB sends the bearer setup or modify accept message to the MME.

405: The eNB sends a bearer setup or modify reject message to the MME.

When sending the bearer setup or modify reject message to the MME, the eNB may further carry a reject reason in the bearer setup or modify reject message. If the UE is an MTC device, the reject reason may be that the eNB is overloaded, the MTC service is overloaded, and so on. The eNB may also add a time parameter to the bearer setup or modify reject message. When receiving the time parameter, the MME may re-initiate a bearer setup or modify request after a corresponding delay period, which is not limited here.

A specific application scenario of the foregoing embodiment is described by taking a scenario as an example, where in an LTE communications system, after an initial context of a UE (such as an MTC device) is set up, an MME sends a bearer setup or modify request message corresponding to the UE to an eNB to request setup or modifying of a bearer of the MTC device. It should be noted that the service control method for an MTC device according to the embodiment of the present invention may also be applicable to other communications systems. Similar network elements may be replaced with reference to the foregoing embodiment of the present invention for applying the method to similar scenarios in other communications systems, which is not described repeatedly here.

It may be seen from the foregoing that, in the embodiment, an MME carries device type indication information of a UE in a bearer setup request message or a bearer modify request message, where the device type indication information of the UE is used to indicate whether the UE is an MTC device, so that after receiving the request message, an eNB may determine, according to a type indication of the UE, whether the UE is an MTC device, and when a current load of the eNB exceeds a set threshold, the eNB may determine, according to the device type of the UE, whether to accept all or part of bearers. With this mechanism, an MTC device may be controlled, which helps to limit implementation of an MTC service triggered by a core-network network element, thereby reducing an impact of the MTC service on an H2H service.

Further, in the embodiment, the MME may also carry service indication information in the bearer setup request message or the bearer modify request message, so that the eNB acquires the priority of the service. When the current load of the eNB exceeds the set threshold, the eNB may determine, according to the priority which is of the service and indicated by a service indicator, whether to accept setup or modifying of all or part of bearers of the MTC device, which helps to limit implementation of a non-emergency MTC service, thereby relatively reducing a network load.

Meanwhile, when the eNB rejects the bearer setup or modify request sent by the MME, the eNB sends a bearer setup or modify reject message to the MME, and carries a reject reason and a time parameter in the bearer setup or modify reject message, so that the MME acquires the reject reason and re-initiates, according to the time parameter, a bearer setup or modify request after a corresponding delay period.

Figure 5:
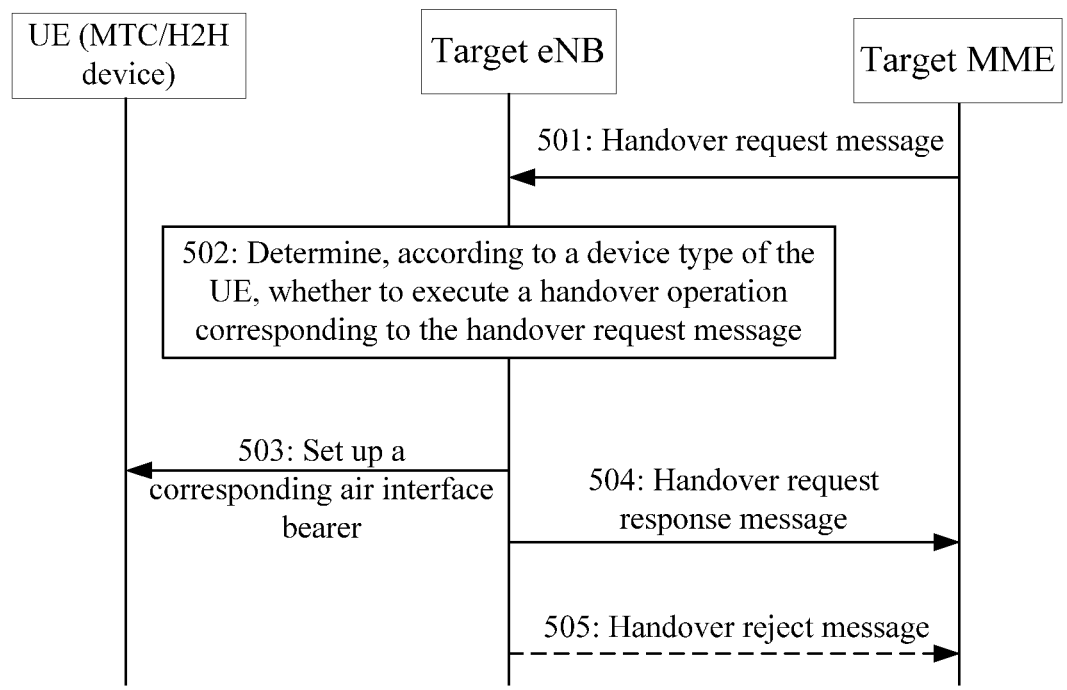
FIG. 5 is a schematic flowchart of another service control method for an MTC device according to an embodiment of the present invention.

In order to facilitate a better understanding of the technical solutions of the present invention, the following takes a cell handover in an LTE communications system as an example, and uses a specific application scenario to describe in detail a service control method for an MTC device described in an embodiment of the present invention. Referring to FIG. 5, the method may include:

501: A target MME sends a handover request message to a target eNB.

In an application scenario, when a UE is in a connected state and requires a cell handover, the target MME sends the handover request message to the target eNB, and carries device type indication information of the UE in the request message for indicating a device type of the UE corresponding to the handover request message, where the device type indication information of the UE may be used to indicate whether the UE is an MTC device.

It is understandable that the device type indication information of the UE may be carried in the handover request message in multiple manners. For example, a new parameter such as an MTC device or H2H communications device indicator may be added to an existing handover request message, or some bits of an existing parameter may be used to indicate the device type of the UE, or an existing parameter may be extended to indicate the device type of the UE, which is not limited here.

Further, the target MME may also carry service indication information for indicating a priority of the service in the handover request message, so that the target eNB acquires the priority of the service. The service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

Similarly, the target MME may carry the service indication information in the handover request message in multiple manners. For example, the priority of the service may be indicated by adding a parameter priority indicator (which may be a high priority, a low priority, or a group of numbers ranging from 0 to 13) to the handover request message, for example, a service indicator based on bearer granularity may be added to E-RAB to Be Setup List; and may also be indicated by using an existing parameter such as QCI in E-RAB Level QoS Parameters under E-RAB to Be Setup List or Priority level in ARP, which is not limited here.

It is understandable that the target MME may also carry other information, such as a UE identifier or a bearer identifier, in the handover request message, which is not limited here.

502: The target eNB determines, according to the device type of the UE, whether to execute a handover operation corresponding to the handover request message.

In an application scenario, when receiving the handover request message sent by the target MME, if the target eNB acquires that the device type of the UE is an MTC device according to the device type indication information which is of the UE and carried in the handover request message, and if a current load of the target eNB exceeds a set threshold, the target eNB may determine, according to the device type of the UE, whether to execute a handover operation corresponding to the handover request message. If the handover request message also carries service indication information for indicating the priority of the service, the target eNB may determine, according to the priority which is of the service and indicated by the service indication information and the device type of the UE, whether to execute the handover operation corresponding to the handover request message.

If yes, steps 503 and 504 are executed.

If no, step 505 is executed.

In an actual application, depending on various application scenarios, the determining, by the target eNB and according to the device type of the UE, whether to execute a handover operation corresponding to the handover request message may be, for example, rejecting all handover requests corresponding to the MTC device; or only accepting a handover request corresponding to an MTC device allowed to be accepted in a service control policy; or according to a current load status of the target eNB, only accepting part of handover requests corresponding to the MTC device; or under a precondition that the priority of the service is acquired, according to a current load status of the target eNB, only accepting a handover request of a service which has a specific priority and corresponds to the MTC device; or according to a current load status of the target eNB and the priority of the service, accepting a specific proportion of handover requests corresponding to the MTC device. Certainly, other solutions may also be used and may be set according to actual network conditions, which is not limited here.

503: The target eNB sets up a corresponding air interface bearer with the UE.

If the UE is an MTC device, when the target eNB determines to execute the handover operation corresponding to the handover request message, the target eNB sets up the corresponding air interface bearer with the MTC device.

504: The target eNB sends a handover request response message to the target MME.

When determining to execute the handover operation corresponding to the handover request message, the target eNB sends a handover request response message to the target MME.

505: The target eNB sends a handover reject message to the target MME.

When sending the handover reject message to the target MME, the target eNB may further carry a reject reason in the handover reject message. If the UE is an MTC device, the reject reason may be that the target eNB is overloaded, the MTC service is overloaded, and so on. The target eNB may also add a time parameter to the handover reject message. When receiving the time parameter, the target MME may re-initiate a handover request after a corresponding delay period, which is not limited here.

A specific application scenario of the foregoing embodiment is described by taking a cell handover in an LTE communications system as an example. It should be noted that the service control method for an MTC device according to the embodiment of the present invention may also be applicable to other communications systems. Similar network elements may be replaced with reference to the foregoing embodiment of the present invention for applying the method to similar scenarios in other communications systems, which is not repeatedly described here.

It may be seen from the foregoing that, in the embodiment, an MME carries device type indication information of a UE in a handover request message, where the device type indication information of the UE is used to indicate whether the UE is an MTC device, so that after receiving the handover request message, a target eNB may determine, according to a type indication of the UE, whether the UE is an MTC device, and if a current load of the target eNB exceeds a set threshold, the target eNB may determine, according to the device type of the UE, whether to execute a handover operation corresponding to the handover request message. With this mechanism, an MTC device may be controlled, which helps to limit implementation of an MTC service triggered by a core-network network element, thereby reducing an impact of the MTC service on an H2H service.

Further, in the foregoing embodiment, the target MME also carries service indication information in the handover request message, so that the target eNB acquires a priority of the service. If the UE is an MTC device and when the current load of the target eNB exceeds the set threshold, the target eNB may determine, according to the priority which is of the service and indicated by a service indicator, whether to execute the handover operation corresponding to the handover request message, which helps to limit implementation of a non-emergency MTC service, thereby relatively reducing a network load.

Meanwhile, when the target eNB rejects the handover request of the target MME, the target eNB sends a handover reject message to the target MME, and carries a reject reason and a time parameter in the handover reject message, so that the target MME acquires the reject reason and re-initiates, according to the time parameter, a handover request after a corresponding delay period.

Figure 6:
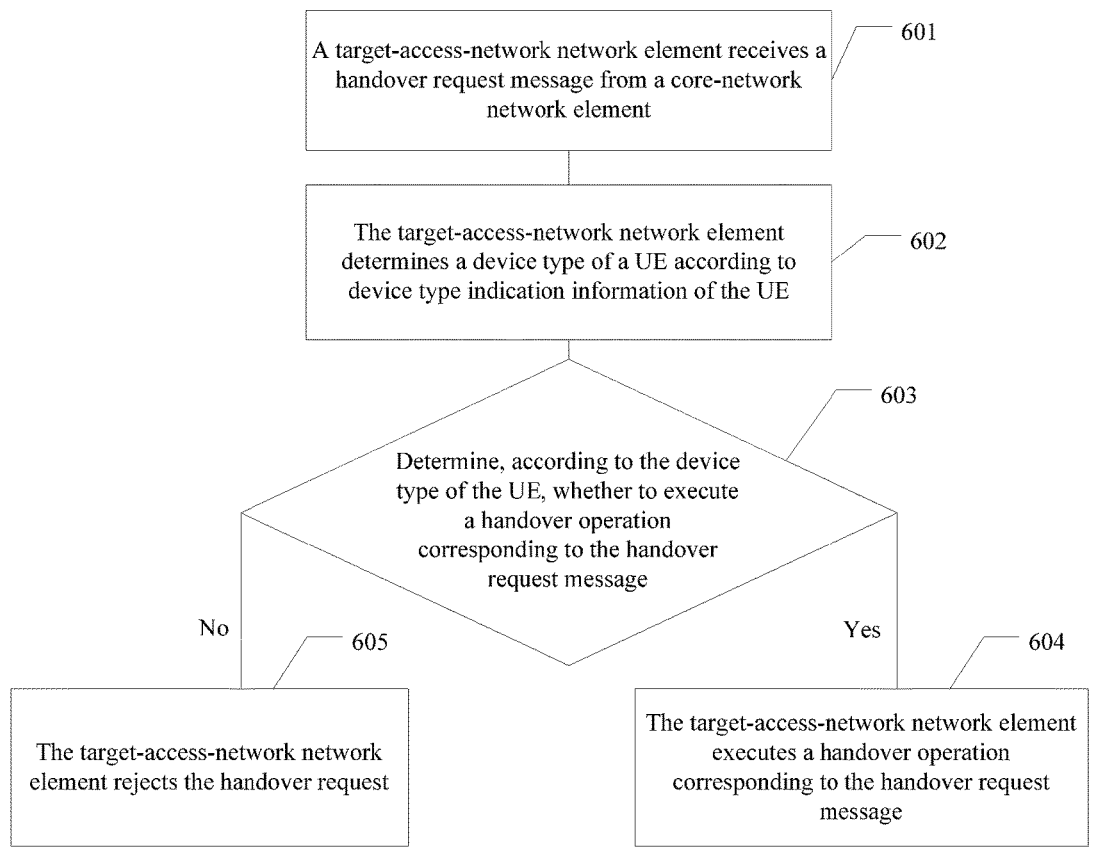
FIG. 6 is a schematic flowchart of another service control method for an MTC device according to an embodiment of the present invention.

The foregoing embodiment is described by taking a process in which a core-network network element triggers performing of a handover by a target-access-network network element. The following describes a service control method for an MTC device of the present invention by taking a process in which a source-access-network network element triggers performing of a handover by a target-access-network network element. Referring to FIG. 6, another embodiment of a service control method for an MTC device according to the embodiments of the present invention includes:

601: A target-access-network network element receives a handover request message from a source-access-network network element.

In an application scenario, when a handover between access-network network elements needs to be performed, the source-access-network network element may send a handover request message to the target-access-network network element.

The source-access-network network element carries device type indication information of a UE in the handover request message. When receiving the handover request message, the target-access-network network element may acquire a device type of the UE corresponding to the handover request message according to the device type indication information which is of the UE and carried in the handover request message, where the device type indication information of the UE may be used to indicate whether the UE is an MTC device.

It is understandable that the source-access-network network element may carry the device type indication information of the UE in the handover request message in multiple manners. For example, the source-access-network network element may add a new parameter to an existing handover request message to indicate the device type of the UE; and may also extend a meaning of an existing parameter in a request message to indicate the device type of the UE, for example, add some bits to the existing parameter to indicate the device type of the UE; and similarly, may use some bits of the existing parameter for indicating instead of adding an indicator bit to the existing parameter, which is not limited here.

Further, the source-access-network network element may also carry service indication information for indicating a priority of the service in the handover request message. The service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

Similarly, the source-access-network network element may also carry the service indication information in the handover request message in multiple manners. For example, the priority of the service may be indicated by adding a parameter priority indicator (which may be a high priority, a low priority, or a group of numbers ranging from 0 to 13) to the handover request message, and may also be represented by using an existing parameter, which is not limited here.

It is understandable that the source-access-network network element may also carry other information, such as a UE identifier, in the handover request message, which is not limited here.

602: The target-access-network network element determines a device type of the UE according to the device type indication information of the UE.

603: The target-access-network network element determines, according to the device type of the UE, whether to execute a handover operation corresponding to the handover request message.

In an application scenario, if the device type indication information of the UE indicates that the device type of the UE is an MTC device, and a current load of the target-access-network network element exceeds a set threshold, the target-access-network network element may determine, according to the device type of the UE, whether to execute the handover operation corresponding to the handover request message. If yes, step 604 is executed; if no, step 605 is executed.

In an actual application, depending on various application scenarios, the determining, by the target-access-network network element and according to the device type of the UE, whether to execute a handover operation corresponding to the handover request message may be, for example, rejecting all handover requests corresponding to the MTC device; or only accepting a handover request corresponding to an MTC device allowed to be accepted in a service control policy; or according to a current load status of the target-access-network network element, only accepting a handover request corresponding to the MTC device; or under a precondition that the priority of the service is acquired, according to a current load status of the target-access-network network element, only accepting a handover request of a service which has a specific priority and corresponds to the MTC device; or according to a current load status of the target-access-network network element and the priority of the service, accepting a specific proportion of handover requests corresponding to the MTC device.

It is understandable that, in addition to the solutions described above, the target-access-network network element may set, according to actual network conditions, whether to execute the handover request corresponding to the MTC device, which is not limited here.

Further, when the current load of the target-access-network network element exceeds the set threshold, if the UE is an MTC device and the handover request message carries service indication information for indicating a priority of the service, the target-access-network network element may determine, according to the priority which is of the service and indicated by the service indication information, whether to execute the handover operation corresponding to the handover request message.

604: The target-access-network network element executes the handover operation corresponding to the handover request message.

In an application scenario, if the target-access-network network element determines that the handover operation corresponding to the handover request message may be executed, the target-access-network network element executes the handover operation corresponding to the handover request message.

605: Reject the handover request.

In an application scenario, when rejecting the handover request, the target-access-network network element may send a handover reject message to the source-access-network network element, and may carry a reason for rejecting the request in the handover reject message, where the reason for rejecting the request may be, for example, the target-access-network network element is overloaded or the target access network is busy; and may also carry a time parameter in the handover reject message, so that the source-access-network network element may re-initiate a handover request after a corresponding delay period according to the time parameter. Certainly, the target-access-network network element may also not carry the reason for rejecting the request and the time parameter in the handover reject message, or not send the handover reject message to the source-access-network network element, which is not limited here.

The service control method for an MTC device according to the embodiment of the present invention may be applicable to scenarios such as an SAE communications system, WCDMA, WiMAX, and GSM.

It may be seen from the foregoing that, in the embodiment of the present invention, device type indication information of a UE is carried in a handover request message, where the device type indication information of the UE is used to indicate whether the UE is an MTC device, so that after receiving the handover request message, a target-access-network network element may determine, according to a device type indicator of the UE, whether the UE is an MTC device, and when a current load of the target-access-network network element exceeds a set threshold, the target-access-network network element may determine, according to the device type of the UE, whether to execute a handover operation corresponding to the handover request. With this mechanism, an MTC device may be controlled, which helps to limit implementation of an MTC service triggered by another access-network network element, thereby reducing an impact of the MTC service on an H2H service.

Figure 7:
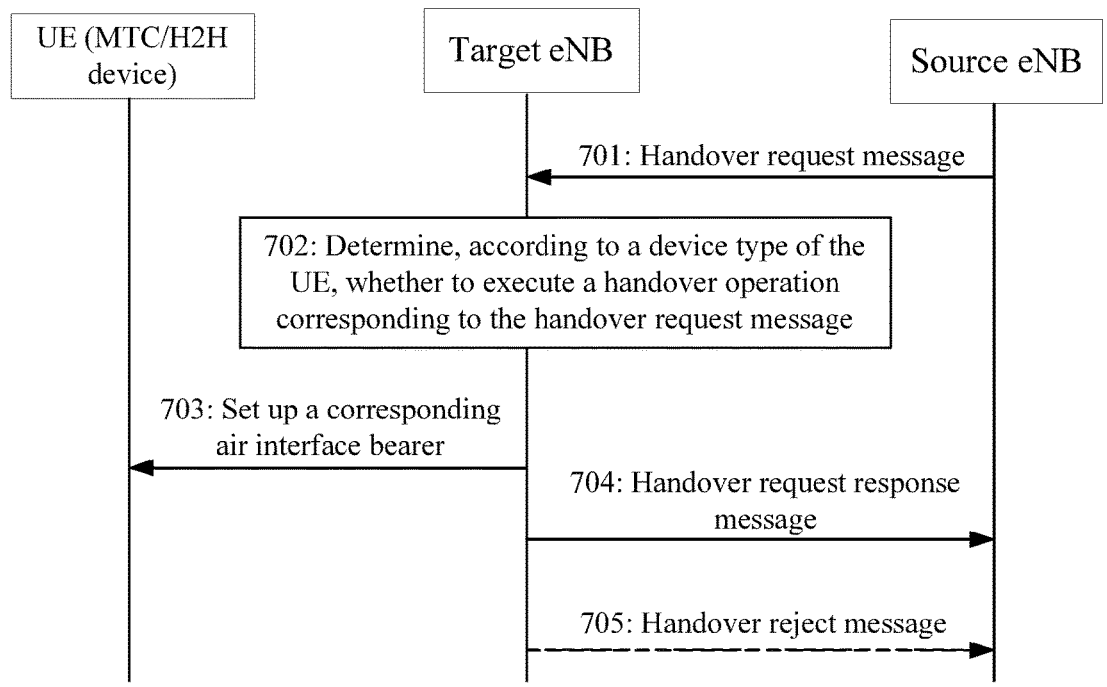
FIG. 7 is a schematic flowchart of another service control method for an MTC device according to an embodiment of the present invention.

In order to facilitate a better understanding of the technical solutions of the present invention, the following takes a handover between eNBs in an LTE communications system as an example, and uses a specific application scenario to describe in detail a service control method for an MTC device described in an embodiment of the present invention. Referring to FIG. 7, the method includes:

701: A source eNB sends a handover request message to a target eNB.

In an application scenario, when a UE is in a connected state and requires a handover between eNBs, the source eNB sends the handover request message to the target eNB, and carries device type indication information of the UE in the handover request message for indicating a device type of the UE corresponding to the handover request message, where the device type indication information of the UE may be used to indicate whether the UE is an MTC device.

It is understandable that the device type indication information of the UE may be carried in the handover request message in multiple manners. For example, a new parameter such as an MTC device or H2H communications device indicator may be added to an existing request message, or some bits of an existing parameter may be used to indicate the device type of the UE, or an existing parameter may be extended to indicate the device type of the UE, which is not limited here.

Further, the source eNB may also carry service indication information for indicating a priority of the service in the handover request message, so that the target eNB acquires the priority of the service. The service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

Similarly, the source eNB may carry the service indication information in the handover request message in multiple manners. For example, the priority of the service may be indicated by adding a parameter priority indicator (which may be a high priority, a low priority, or a group of numbers ranging from 0 to 13) to the handover request message, for example, a service indicator based on bearer granularity may be added to E-RAB to Be Setup List; and may also be indicated by using an existing parameter such as QCI in E-RAB Level QoS Parameters under E-RAB to Be Setup List or Priority level in ARP, which is not limited here.

It is understandable that the source eNB may also carry other information, such as a UE identifier or a bearer identifier, in the handover request message, which is not limited here.

702: The target eNB determines, according to the device type of the UE, whether to execute a handover operation corresponding to the handover request message.

When receiving the handover request message sent by the source eNB, if the target eNB acquires that the device type of the UE is an MTC device according to the device type indication information which is of the UE and carried in the handover request message, and when a current load of the target eNB exceeds a set threshold, the target eNB may determine, according to the device type of the UE, whether to execute a handover operation corresponding to the handover request message. If the handover request message also carries the service indication information for indicating the priority of the service, the target eNB may determine, according to the priority which is of the service and indicated by the service indication information and the device type of the UE, whether to execute the handover operation corresponding to the handover request message.

If yes, steps 703 and 704 are executed.

If no, step 705 is executed.

In an actual application, depending on various application scenarios, the determining, by the target eNB and according to the device type of the UE, whether to execute a handover operation corresponding to the handover request message may be, for example, rejecting all handover requests corresponding to the MTC device; or only accepting a handover request corresponding to an MTC device allowed to be accepted in a service control policy; or according to a current load status of the target eNB, only accepting part of handover requests corresponding to the MTC device; or under a precondition that the priority of the service is acquired, according to a current load status of the target eNB, only accepting a handover request of a service which has a specific priority and corresponds to the MTC device; or according to a current load status of the target eNB and the priority of the service, accepting a specific proportion of handover requests corresponding to the MTC device. Certainly, other solutions may also be used and may be set according to actual network conditions, which is not limited here.

703: The target eNB sets up a corresponding air interface bearer with the UE.

For example, if the UE is an MTC device, when determining to execute the handover operation corresponding to the handover request message, the target eNB may set up the corresponding air interface bearer with the MTC device.

704: The target eNB sends a handover request response message to the source eNB.

When determining to execute the handover operation corresponding to the handover request message, the target eNB sends a handover request response message to the source eNB.

705: The target eNB sends a handover reject message to the source eNB.

When sending the handover reject message to the source eNB, the target eNB may further carry a reject reason in the handover reject message. If the UE is an MTC device, the reject reason may be that the target eNB is overloaded, the MTC service is overloaded, and so on. The target eNB may also add a time parameter to the handover reject message. When receiving the time parameter, the source eNB may re-initiate a handover request after a corresponding delay period, which is not limited here.

A specific application scenario of the foregoing embodiment is described by taking a handover between eNBs in an LTE communications system as an example. It should be noted that the service control method for an MTC device according to the embodiment of the present invention may also be applicable to other communications systems. Similar network elements may be replaced with reference to the foregoing embodiment of the present invention for applying the method to other communications systems, which is not repeatedly described here.

It may be seen from the foregoing that, in the embodiment, a source-access-network network element carries device type indication information of a UE in a handover request message, where the device type indication information of the UE is used to indicate whether the UE is an MTC device, so that after receiving the handover request message, a target eNB may determine, according to a device type indicator of the UE, whether the UE is an MTC device, and if a current load of the target eNB exceeds a set threshold, the target eNB may determine, according to the device type of the UE, whether to execute a handover operation corresponding to the handover request message. With this mechanism, an MTC device may be controlled, which helps to limit implementation of an MTC service triggered by another access-network network element, thereby reducing an impact of the MTC service on an H2H service.

Further, in the foregoing embodiment, the source eNB also carries service indication information in the handover request message, so that the target eNB acquires a priority of the service. If the UE is an MTC device and when the current load of the target eNB exceeds the set threshold, the target eNB may determine, according to the priority which is of the service and indicated by a service indicator, whether to execute the handover operation corresponding to the handover request message, which helps to limit implementation of a non-emergency MTC service, thereby relatively reducing a network load.

Meanwhile, when the target eNB rejects the handover request of the source eNB, the target eNB sends a handover reject message to the source eNB, and carries a reject reason and a time parameter in the handover reject message, so that the source eNB acquires the reject reason and re-initiates, according to the time parameter, a handover request after a corresponding delay period.

Figure 8:
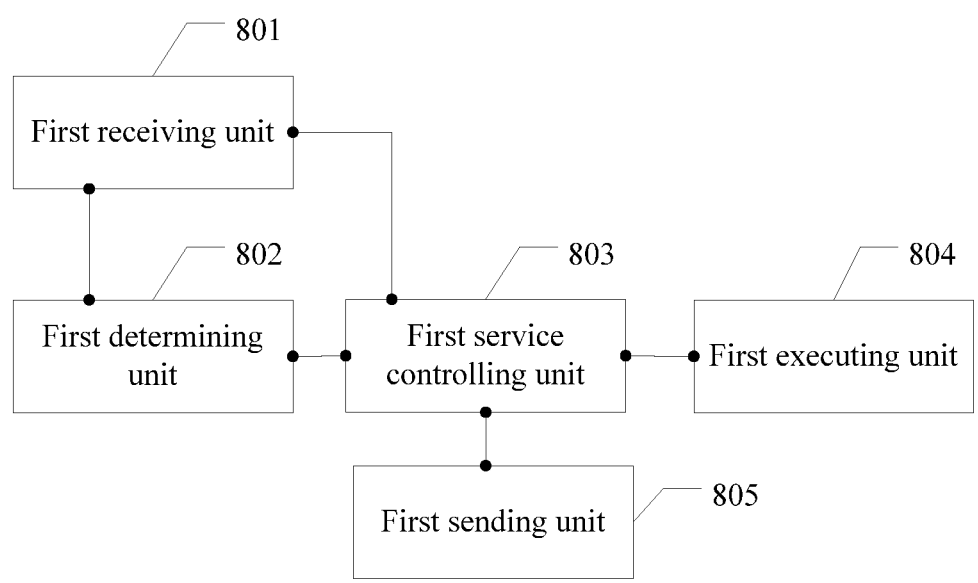
FIG. 8 is a schematic structural diagram of an access-network network element according to an embodiment of the present invention.

The following describes an access-network network element based on the foregoing service control method for an MTC device and used for interacting with a core-network network element. Referring to FIG. 8, an access-network network element provided by an embodiment of the present invention may include:

A first receiving unit 801 is configured to receive a service request message from a core-network network element, where the service request message carries device type indication information of a UE, and the device type indication information of the UE is used to indicate whether the UE is an MTC device.

In actual applications, for example, in an application scenario where a UE (such as an MTC device or an H2H communications device) needs to be paged, an initial context corresponding to a UE needs to be set up, or a UE needs to be handed over between access-network network elements, or in another application scenario, a core-network network element may deliver a service request message carrying device type indication information of the UE to the access-network network element.

Further, the core-network network element may also carry service indication information for indicating a priority of the service in the delivered service request message. The service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

A first determining unit 802 is configured to determine a device type of the UE according to the device type indication information of the UE.

A first service controlling unit 803 is configured to, if a current load of the access-network network element exceeds a set threshold, determine, according to the device type which is of the UE and determined by the first determining unit 802, whether to execute a service operation corresponding to the service request message.

In an application scenario, if the service request message carries the service indication information for indicating a priority of the service, the first service controlling unit 803 may determine, according to the priority which is of the service and indicated by the service indication information and the device type of the UE, whether to execute the service operation corresponding to the service request message.

A first executing unit 804 is configured to, when the first service controlling unit 803 determines to execute the service operation corresponding to the service request message, execute the service operation corresponding to the service request message. For example, when the first service controlling unit 803 determines to execute the service operation corresponding to the service request message, and the UE is an MTC device, if the service request message is a paging request message, the first executing unit 804 initiates paging to an MTC device to be paged by the core-network network element; or if the service request message is an initial context setup request message, the first executing unit 804 sets up an initial context corresponding to the MTC device; or if the service request message is a handover request message, the first executing unit 804 executes a handover operation corresponding to the handover request message; or if the service request message is a bearer setup request message or a bearer modify request message after an initial context is set up, the first executing unit 804 sets up or modifies a bearer of a corresponding MTC device.

In an application scenario, the access-network network element may further include: a first sending unit 805 configured to, when the first service controlling unit 803 determines not to execute the service operation corresponding to the service request message, send a service reject message to the core-network network element which sends the service request message, where the service reject message may carry a reason for rejecting the request and a time parameter, so that the core-network network element acquires the reject reason and re-initiates, according to the time parameter, a request after a corresponding delay period.

It should be noted that the access-network network element in the embodiment may be used to implement all technical solutions of the foregoing first to fifth method embodiments and that functions of its functional modules may be implemented according to the foregoing first to fifth method embodiments. For its specific implementation process, reference may be made to the foregoing first to fifth embodiments, and details are not repeatedly described here.

It may be seen from the foregoing that, when receiving a service request message which carries device type indication information of a UE and is sent by a core-network network element, an access-network network element may acquire whether the UE is an MTC device according to the device type indication information of the UE, and if a current load of the access-network network element exceeds a set threshold, determine, according to the device type of the UE, whether to execute a service operation corresponding to the service request message. With this mechanism, an MTC device may be controlled, which helps to limit implementation of an MTC service triggered by the core-network network element, thereby reducing an impact of the MTC service on an H2H service.

Meanwhile, when determining not to execute the service operation corresponding to the service request message, the access-network network element in the embodiment may also send a service reject message to the core-network network element which sends the service request message to the core-network network element, so that the core-network network element may acquire feedback information about the service request in time, and re-initiate, according to a time parameter carried in the reject message, a service request after a corresponding delay period.

Figure 9:
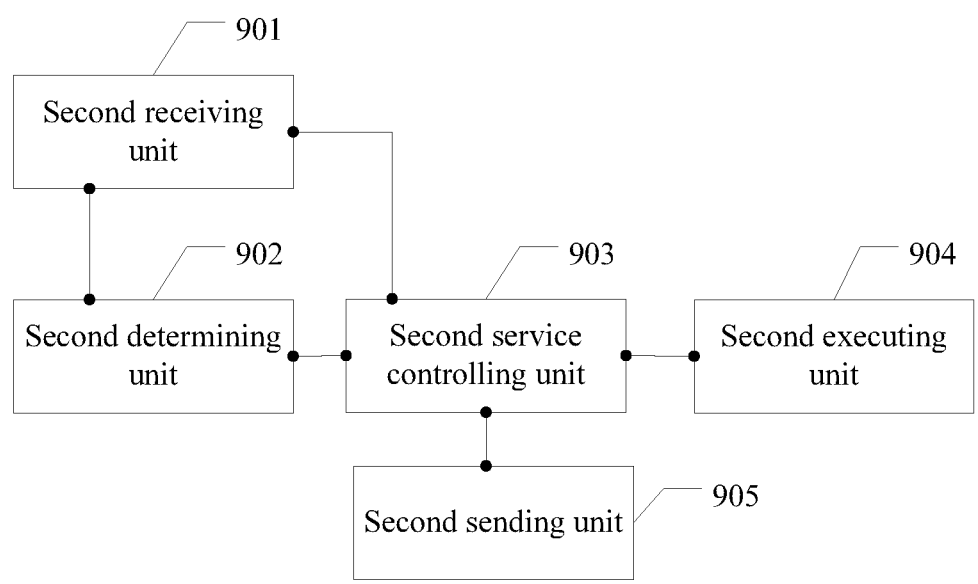
FIG. 9 is a schematic structural diagram of another access-network network element according to an embodiment of the present invention.

The following describes an access-network network element based on the foregoing service control method for an MTC device and used for interacting with a source-access-network network element. Referring to FIG. 9, an access-network network element provided by an embodiment of the present invention may include:

A second receiving unit 901 is configured to receive a handover request message which carries device type indication information of a UE and sent by a source-access-network network element, where the device type indication information of the UE is used to indicate whether the UE is an MTC device.

Further, the handover request message may also carry service indication information for indicating a priority of the service.

A second determining module 902 is configured to determine a device type of the UE according to the device type indication information of the UE.

A second service controlling unit 903 is configured to, when a current load of the access-network network element exceeds a set threshold, determine, according to the device type which is of the UE and determined by the second determining module 902, whether to execute a handover operation corresponding to the handover request message.

In an application scenario, if the handover request message carries the service indication information for indicating the priority of the service, the second service controlling unit 903 may determine, according to the priority which is of the service and indicated by the service indication information and the device type of the UE, whether to execute the handover operation corresponding to the handover request message.

A second executing unit 904 is configured to, when the second service controlling unit 903 determines to execute the handover operation corresponding to the handover request message, execute the handover operation corresponding to the handover request message.

In an application scenario, the access-network network element may further include a second sending unit 905 configured to send a handover reject message to the source-access-network network element when the second service controlling unit 903 determines not to execute the handover operation corresponding to the handover request message.

The handover reject message may carry a reason for rejecting the request and a time parameter, so that the source-access-network network element acquires the reject reason and may re-initiate, according to the time parameter, a handover request after a corresponding delay period.

It should be noted that the access-network network element in the embodiment may be used to implement all technical solutions of the foregoing methods, and that functions of functional modules may be implemented according to the methods in the foregoing method embodiments, and details are not repeatedly described here.

It may be seen from the foregoing that, when receiving a handover request message which carries device type indication information of a UE and is sent by a source-access-network network element, an access-network network element may acquire whether the UE is an MTC device according to the device type indication information of the UE, and if a current load of the access-network network element exceeds a set threshold, determine, according to the device type of the UE, whether to execute a handover operation corresponding to the handover request message. With this mechanism, an MTC device may be controlled, which helps to limit implementation of an MTC service triggered by another access-network network element, thereby reducing an impact of the MTC service on an H2H service.

Meanwhile, when determining not to execute the handover operation corresponding to the handover request message, the access-network network element in the embodiment may send a handover reject message to the source-access-network network element, so that the source-access-network network element may acquire feedback information about the handover request in time, and re-initiate, according to a time parameter carried in the handover reject message, a handover request after a corresponding delay period.

Figure 10:
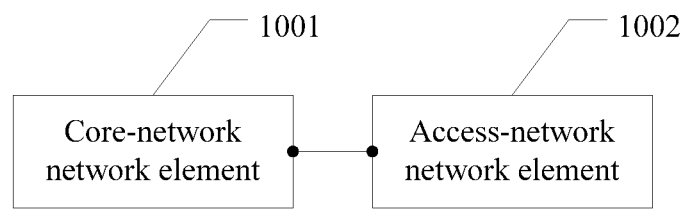
FIG. 10 is a schematic structural diagram of a service control system according to an embodiment of the present invention.

A service control system is provided by an embodiment of the present invention. Referring to FIG. 10, the service control system includes:

A core-network network element 1001 is configured to send a service request message carrying device type indication information of a UE to an access-network network element 1002 to indicate a device type of the UE corresponding to the service request, where the device type indication information of the UE is used to indicate whether the UE is an MTC device.

In actual applications, for example, in an application scenario where a UE (such as an MTC device or an H2H communications device) needs to be paged, an initial context corresponding to a UE needs to be set up, or a UE needs to be handed over between access-network network elements, or in another application scenario, the core-network network element 1001 sends a service request message carrying device type indication information of the UE to the access-network network element 1002.

Further, the core-network network element 1001 may also carry service indication information for indicating a priority of the service in the service request message. The service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

The access-network network element 1002 is configured to receive the service request message delivered by the core-network network element 1001; determine the device type of the UE according to the device type indication information of the UE; and when a current load of the access-network network element 1002 exceeds a set threshold, determine, according to the device type of the UE, whether to execute a service operation corresponding to the service request message.

In an application scenario, if the service request message carries the service indication information for indicating the priority of the service, the access-network network element 1002 may determine, according to the priority which is of the service and indicated by the service indication information and the device type of the UE, whether to execute the service operation corresponding to the service request message.

Further, when determining not to execute the service operation corresponding to the service request message, the access-network network element 1002 may also send a service reject message to the core-network network element 1001, where the service reject message may carry a reason for rejecting the request and a time parameter, so that the core-network network element 1001 acquires the reject reason, and may re-initiate, according to the time parameter, a service request after a corresponding delay period.

A structure of the access-network network element 1002 in the embodiment may be as the access-network network element shown in FIG. 8.

It may be seen from the foregoing that, in a service control system in the embodiment, a core-network network element carries device type indication information of a UE in a service request message, where the device type indication information of the UE is used to indicate whether the UE is an MTC device, so that when the core-network network element requests a downlink service from an access-network network element, the access-network network element performs a function of selective accessing for the MTC device. With this mechanism, an MTC device may be controlled, which helps to limit implementation of an MTC service triggered by the core-network network element, thereby reducing an impact of the MTC service on an H2H service.

Figure 11:
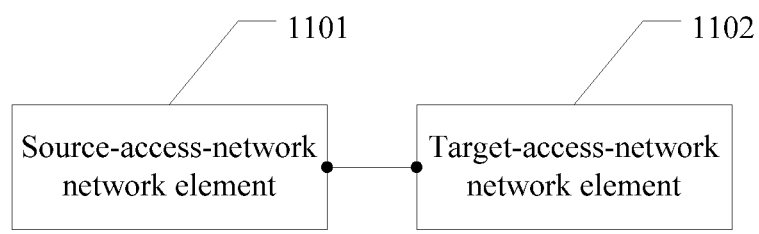
FIG. 11 is a schematic structural diagram of another service control system according to an embodiment of the present invention.

The following describes another service control system provided by an embodiment of the present invention. Referring to FIG. 11, the service control system includes:

A source-access-network network element 1101 is configured to, when a handover between access-network network elements needs to be performed, send a handover request message carrying device type indication information of a UE to a target-access-network network element 1102, to indicate a device type of the UE corresponding to the handover request message, where the device type indication information of the UE is used to indicate whether the UE is an MTC device.

Further, the source-access-network network element 1101 may also carry service indication information for indicating a priority of the service in the sent handover request message. The service indication information for indicating the priority of the service may, for example, indicate a priority number of the service, and may also indicate a service attribute such as time tolerance (for example, whether a delay is allowed or not) information, or may be other information which may directly or indirectly indicate the priority of the service, which is not limited here.

The target-access-network network element 1102 is configured to receive the handover request message sent by the source-access-network network element 1101; determine the device type of the UE according to the device type indication information of the UE; and when a current load of the target access network exceeds a set threshold, determine, according to the device type of the UE, whether to execute a handover operation corresponding to the handover request message.

In an application scenario, if the handover request message carries the service indication information for indicating the priority of the service, the target-access-network network element 1102 may determine, according to the priority which is of the service and indicated by the service indication information and the device type of the UE, whether to execute the handover operation corresponding to the handover request message.

Further, when determining not to execute the handover operation corresponding to the handover request message, the target-access-network network element 1102 may also send a handover reject message to the source-access-network network element 1101, where the handover reject message may carry a reason for rejecting the request and a time parameter, so that the source-access-network network element 1101 acquires the reject reason, and may re-initiate, according to the time parameter, a handover request after a corresponding delay period.

Internal structural units of the target-access-network network element 1102 in the embodiment may be as the access-network network element shown in FIG. 9.

It may be seen from the foregoing that, in a service control system in the embodiment, a source-access-network network element carries device type indication information of a UE in a handover request message, where the device type indication information of the UE is used to indicate whether the UE is an MTC device, so that when a handover between access-network network elements is performed, a target-access-network network element performs a function of selective accessing for the MTC device. With this mechanism, an MTC device may be controlled, which helps to limit implementation of an MTC service triggered by another access-network network element, thereby reducing an impact of the MTC service on an H2H service.

Persons of ordinary skill in the art may understand that all or part of the steps of the method according to the foregoing embodiments may be implemented by a program instructing relevant hardware. The program may be stored in a computer readable storage medium, and the storage medium may be a read-only memory, a magnetic disk, or an optical disk, and so on.

The service control method for an MTC device and the related apparatus and system provided by the present invention are described in detail above. Persons of ordinary skill in the art may make variations to the specific implementation manners and application scopes based on the ideas of the embodiments of the present invention. To sum up, the content of the specification shall not be construed as a limitation to the present invention.

What is claimed is:

1. A service control method for a machine type communications (MTC) device, comprising:
   receiving, by an access-network network element, a paging request message from a core-network network element, wherein the paging request message carries device type indication information of a paged user equipment (UE);
   determining a device type of the UE according to the device type indication information of the UE; and
   performing at least one service operation when the UE is the MTC device and when a current load of the access-network element exceeds a set threshold.

2. The method according to claim 1, wherein the at least one service operation comprises paging the UE by using a dedicated paging resource allocated to an MTC device.

3. The method according to claim 2, wherein the dedicated paging resource comprises a dedicated paging channel (PCH) or paging parameters of an MTC device, and wherein the paging parameters comprise a paging frame number and a paging occasion.

4. The method according to claim 1, wherein the at least one service operation comprises:
   determining whether the UE is an MTC device allowed to be accessed in a service control policy; and
   paging the UE when the UE is the MTC device allowed to be accessed in the service control policy.

5. The method according to claim 1, wherein the at least one service operation comprises:
   determining not to page the UE; and
   sending a paging reject message to the core-network network element.

6. The method according to claim 5, wherein the paging request message further carries service indication information for indicating a priority of a service, and wherein before performing the at least one service operations, the method further comprises determining, according to the priority which is of the service and indicated by the service indication information and the device type of the UE, whether to page the UE.

7. The method according to claim 5, wherein the paging reject message carries a time parameter, and the wherein method further comprises after a delay period of the time parameter, receiving a paging request message resent by the core-network network element.

8. An access-network network element, comprising:
- a non-transitory computer readable medium having instructions stored thereon; and
- a computer processor coupled to the non-transitory computer readable medium and configured to execute the instructions to:
  - receive a paging request message from a core-network network element, wherein the paging request message carries device type indication information of a paged user equipment (UE);
  - determine a device type of the UE according to the device type indication information of the UE; and
  - perform at least one service operation when the UE is a machine type communications (MTC) device type and when a current load of the access-network element exceeds a set threshold.

9. The access-network network element according to claim 8, wherein the at least one service operation comprises paging the UE by using a dedicated paging resource allocated to an MTC device.

10. The access-network element according to claim 9, wherein the dedicated paging resource comprises a dedicated paging channel (PCH) or paging parameters of an MTC device, and wherein the paging parameters comprise a paging frame number and a paging occasion.

11. The access-network network element according to claim 8, wherein the at least one service operation comprises determining whether the UE is an MTC device allowed to be accessed in a service control policy, and paging the UE when the UE is the MTC device allowed to be accessed in the service control policy.

12. The access-network network element according to claim 8, wherein the at least one service operation comprises determining not to page the UE, and sending a paging reject message to the core-network network element.

13. The access-network network element according to claim 12, wherein the paging reject message carries a time parameter, and wherein the computer processor is further configured to execute the instructions to receive a paging request message resent by the core-network network element after a delay period of the time parameter.

14. The access-network network element according to claim 8, wherein the paging request message further carries service indication information for indicating a priority of a service, and wherein the computer processor is further configured to execute the instructions to determine, according to the priority which is of the service and indicated by the service indication information and the device type of the UE, whether to page the UE.

* * * * *